Patented Feb. 16, 1943

2,311,526

UNITED STATES PATENT OFFICE 2,311,526

HEAT-CONDUCTING LUTING MATERIAL

William C. Ferguson and Paul Sussenbach, St. Louis, Mo., assignors to The Presstite Engineering Company, St. Louis, Mo., a corporation of Missouri No Drawing. Application June 30, 1939, Serial No. 282,065

2 Claims. (Cl. 260—765)

This invention relates to luting materials, and with regard to certain more specific features, to heat-conductive luting materials.

Among the several objects of the invention may be noted the provision of a luting or gum-like or mastic-like material which has incorporated therein highly heat-conductive metallic particles, whereby the material is adapted for use, for example, as a plastic connecting material used for holding together various members which are desired to be in heat conductive relationship, such as the coils of a refrigerator cooling unit; the provision of a material of the class described which is substantially odorless and which is highly adhesive to metal surfaces; the provision of a material of the class described which is relatively non-oxidizing, so that it does not harden and eventually crack away; the provision of a material of the class described which maintains its usable plastic characteristics at ranges of temperature from the order of $-40°$ F. to $150°$ F.; and the provision of a material of the class described which is relatively simple and economical to manufacture. Other objects will be in part obvious and in part pointed out hereinafter.

The invention accordingly comprises the ingredients and combinations of ingredients, the proportions thereof, and features of composition, which will be exemplified in the products hereinafter described, and the scope of the application of which will be indicated in the following claims.

In the construction of ice cream cabinets, beverage coolers, and like apparatus, the container can in these cabinets is most usually cooled by means of brine which circulates in a copper tube which is conducted back and forth across the surface of the container. The effectiveness of this arrangement depends upon the ability of the brine in the tube to absorb the heat from the interior of the cabinet. This effectiveness is very largely dependent upon contact between the copper tube and the outer face of the container.

The current practice is either to continuously solder such tubes to the cabinet, or to spot-weld thin strips of metal to attach the tube to the container. The soldering procedure, although fairly satisfactory from the mechanical and heat-transference standpoints, is disadvantageous both in the cost of the solder and in the labor cost incident to using the solder. With the spot welding procedure, which is cheaper, more disadvantages accrue. As both the tube and the container wall are irregular in shape, only indifferent contact, however, is thereby secured. Consequently this method of attaching tubes to the outer walls of the container is disadvantageous in the poor heat conductive relationship obtained between the tubes and the container.

The present invention provides a material of plastic characteristics, somewhat like a putty, for example, which exhibits strong adhesive qualities for the metals of the tube and the container wall, and which may be used in massive quantities to bring about a relatively large area of heat-conducting contact between the tube and the container wall. This material consists of a vehicle or gum or plastic base of suitable viscosity, preferably a tacky asphalt, plasticized with a practically odorless and non-oxidizing liquid. Into this gum base is mixed a metallic flake or granule having high heat transference characteristics. It has been found preferable to use the metal in the form of flakes, because the flake form apparently not only transfers the heat better, but its shape is such that when it is mixed in the gum it can be used almost like a putty and will not slump or flow even though it may be very soft in consistency. Metallic aluminum flakes have been found most desirable, but copper and zinc flakes are likewise usable, as are any other metallic flakes of high heat transference characteristics.

Such metallic flakes, particularly the aluminum flakes, are used in the painting industry and are there called bronzing powders or the like.

The resulting material resembles very much an ordinary putty or caulking material, except that it is made with aluminum or the like. It can be applied either with a gun or with a putty knife, and its ability to transfer heat from the walls of the container to the copper tubing approximates that of solder.

Inasmuch as the material is to be used in cabinets which are to be used for food storage and which are shipped from the factory to the point of use, there are several characteristics which the plastic base should have for maximum utility. In the first place, the plastic base itself should have as high heat transference characteristics as practicable, for such a class of materials. In the second place, the plastic base should be practically odorless, for most materials having an odor are generally unsuitable for use in connection with foods. The plastic base should also be highly adhesive to metal surfaces so that jarring will not loosen it from either the pipe or the walls of the container. It should also be non-oxidizing so that it will not harden and eventually crack away from either of the surfaces to which it is attached. Furthermore, it should have a low susceptibility factor, that is to say, it should retain its desired plastic characteristics without substantial impairment at maximum summer temperatures of the order of 150° F. and minimum winter temperatures of the order of —40° F., without becoming runny or brittle.

A suitable plastic base, for example, can be made by heating together a soft natural asphalt (or a petroleum asphalt, such as a lubricating oil still residue) and a portion of a relatively non-volatile petroleum oil, such as a motor lubricating oil of S. A. E. viscosity of 50, blended with a small quantity of aluminum stearate which is a soap. For example, 39.50 parts of such a lubricating oil, blended with 1.00 part of aluminum stearate, may be heated together with 10.25 parts of asphalt to a temperature of 250° F.

To this plastic base may also be added a small quantity of crepe rubber or the like, for improving the stretchability and ductility of the plastic base. The aluminum stearate for example may comprise about one part by weight in the above mixture, and the crepe rubber about 0.024 part by weight in the above mixture. The addition to the above mixture of about 0.22 part by weight of a non-volatile light lubricating oil, as a fluxing oil, will improve the plasticity of the mixture.

After these ingredients are worked together to form a homogeneous gummy base, then (on the same proportional basis) about 49 parts by weight of flake aluminum are worked into the gum, and thoroughly disseminated therethrough.

The product made in the above described manner possesses all of the qualities heretofore designated as desirable in connection with the composition of the present invention.

However, it will be understood that other gummy plastic base materials are suitable for use in connection with the present invention.

A non-oil soluble vehicle can be used where the product material is desired for use around oily parts, such as running machinery. Certain synthetic resins possess this feature of non-oil solubility.

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

We claim:

1. A luting material comprising approximately 50% by weight of metallic powder, approximately 40% by weight of a petroleum lubricating oil, and approximately 10% by weight of an asphaltic binder.

2. A luting material comprising approximately 50% by weight of aluminum flake powder, approximately 39% by weight of a petroleum lubricating oil, approximately 10% by weight of an asphaltic binder, the remainder comprising small quantities of soap and rubber.

WILLIAM C. FERGUSON.
PAUL SUSSENBACH.